United States Patent
Skinner et al.

(10) Patent No.: US 11,190,705 B2
(45) Date of Patent: Nov. 30, 2021

(54) INTELLIGENT ARRAY OF LIGHTS FOR ILLUMINATION

(71) Applicant: Lenovo (Singapore) Pte. Ltd., Singapore (SG)

(72) Inventors: Jeffrey E. Skinner, Raleigh, NC (US); Aaron M. Stewart, Raleigh, NC (US); Lincoln P. Hancock, Raleigh, NC (US); Jonathan J. Yu, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 11 days.

(21) Appl. No.: 16/820,342

(22) Filed: Mar. 16, 2020

(65) Prior Publication Data

US 2021/0289120 A1    Sep. 16, 2021

(51) Int. Cl.
*H04N 5/235* (2006.01)
*H04N 5/225* (2006.01)

(52) U.S. Cl.
CPC .......... *H04N 5/2354* (2013.01); *H04N 5/2256* (2013.01); *H04N 5/2351* (2013.01)

(58) Field of Classification Search
CPC .............. H04N 5/2354; H04N 5/2351; H04N 5/2256
See application file for complete search history.

(56) References Cited

U.S. PATENT DOCUMENTS

| | | | |
|---|---|---|---|
| 9,122,320 B1* | 9/2015 | Rowles | H04N 5/2253 |
| 9,635,255 B1* | 4/2017 | Baldwin | H04N 5/2354 |
| 2009/0175555 A1* | 7/2009 | Mahowald | H04N 5/2351 |
| | | | 382/274 |
| 2013/0314581 A1* | 11/2013 | Kido | H04N 5/23219 |
| | | | 348/333.12 |
| 2014/0055978 A1* | 2/2014 | Gantz | H04N 5/2256 |
| | | | 362/8 |
| 2014/0340572 A1* | 11/2014 | Sato | G03B 15/05 |
| | | | 348/370 |
| 2015/0002735 A1* | 1/2015 | Moskovchenko | G06K 9/4652 |
| | | | 348/370 |
| 2017/0262969 A1* | 9/2017 | Inoue | H04N 5/2354 |
| 2017/0374335 A1* | 12/2017 | Hsu | G03B 15/03 |
| 2018/0260929 A1* | 9/2018 | Belogolovy | H04N 5/23267 |
| 2018/0347805 A1* | 12/2018 | Abou-Fadel | H04N 5/2256 |

* cited by examiner

*Primary Examiner* — Lin Ye
*Assistant Examiner* — John H Morehead, III
(74) *Attorney, Agent, or Firm* — VanLeeuwen & VanLeeuwen; Philip L. Weinstein

(57) ABSTRACT

An approach is provided that uses an array of LEDs to illuminate for digital image capturing. A system that includes a processor, a memory accessible by the processor, a digital camera accessible by the processor, a display screen accessible by the processor, and an array of a plurality of LEDs surrounding the display screen, where the array of LEDs is also accessible by the processor. Preferred image quality attributes are retrieved. Then a setting of a set of LEDs is made to a lighting attribute, such as color or brightness. Afterwards, the an image of a subject illuminated by the plurality of LEDs is captured and attributes of this image are compared to the preferred image quality attributes. Based on the comparison, the approach then adjusts the attributes of the set of LEDs.

17 Claims, 4 Drawing Sheets

Intelligent Array of Lights at Perimeter
of Display Screen to Illuminate Subject
in Changing Light Conditions 300

Illuminated frame section
Non-Illuminated frame section

Intelligent Array of Lights
Frame on a Display Screen 300

INTELLIGENT ARRAY OF LIGHTS FOR ILLUMINATION

BACKGROUND

Solutions exist to eliminate or reduce the problem of poor lighting in video and image capturing arenas. For example, a person can manually adjust the environment to add, reduce or redirect light. Unfortunately, this requires time, know-how and an environment where the lighting can be somewhat easily altered. Accessories for phones exist that provide improved front facing light, however these solutions sacrifice elegance and intelligence. Traditional solutions essentially attach a flashlight to the user's device. There are also solutions like "wide dynamic range" (WDR) that can be built into the camera. WDR captures multiple exposures in the same field of vision and merges them together for an optimized image. For backlit subjects, a short exposure might be applied to the background while a long exposure might be applied to the subject. While useful, WDR requires a light and dark contrast to function properly. Accordingly, WDR is not effective in illuminating a subject in a darker room or environment.

SUMMARY

An approach is provided that uses an array of LEDs to illuminate for digital image capturing. A system that includes a processor, a memory accessible by the processor, a digital camera accessible by the processor, a display screen accessible by the processor, and an array of a plurality of LEDs surrounding the display screen, where the array of LEDs is also accessible by the processor. Preferred image quality attributes are retrieved. Then a setting of a set of LEDs is made to a lighting attribute, such as color or brightness. Afterwards, the an image of a subject illuminated by the plurality of LEDs is captured and attributes of this image are compared to the preferred image quality attributes. Based on the comparison, the approach then adjusts the attributes of the set of LEDs.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein:

FIG. 3A is an example of lighting completely around the display;

FIG. 3B is an example of lighting the top and sides around the display;

FIG. 3C is an example of lighting the bottom and sides around the display;

FIG. 3D is an example of lighting the top and bottom around the display;

FIG. 3E is an example of lighting the left and right sides around the display;

FIG. 3F is an example of lighting the top and right side around the display;

FIG. 3G is an example of lighting the upper left and lower right corner areas around the display;

FIG. 3H is an example of providing intermittent lighting areas around the display;

FIG. 3I is an example of incorporating the light bars shown in FIGS. 3A-3H with an actual display.

DETAILED DESCRIPTION

The figures show an approach is provided that uses an array of LEDs to illuminate for digital image capturing. A system that includes a processor, a memory accessible by the processor, a digital camera accessible by the processor, a display screen accessible by the processor, and an array of a plurality of LEDs surrounding the display screen, where the array of LEDs is also accessible by the processor. Preferred image quality attributes are retrieved. Then a setting of a set of LEDs is made to a lighting attribute, such as color or brightness. Afterwards, the an image of a subject illuminated by the plurality of LEDs is captured and attributes of this image are compared to the preferred image quality attributes. Based on the comparison, the approach then adjusts the attributes of the set of LEDs.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
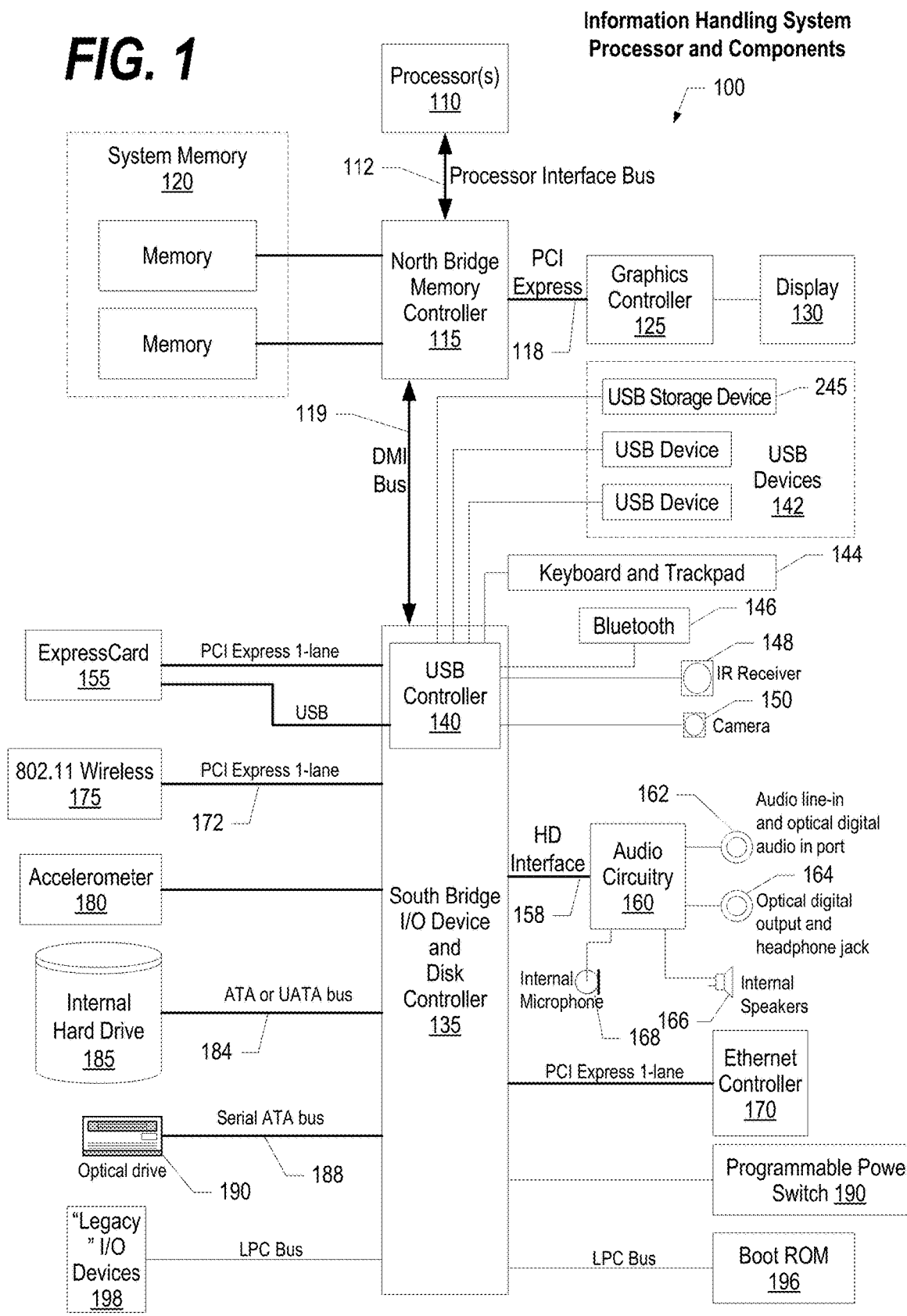
FIG. 1 is a block diagram of a data processing system in which the methods described herein can be implemented.
Figure 2:
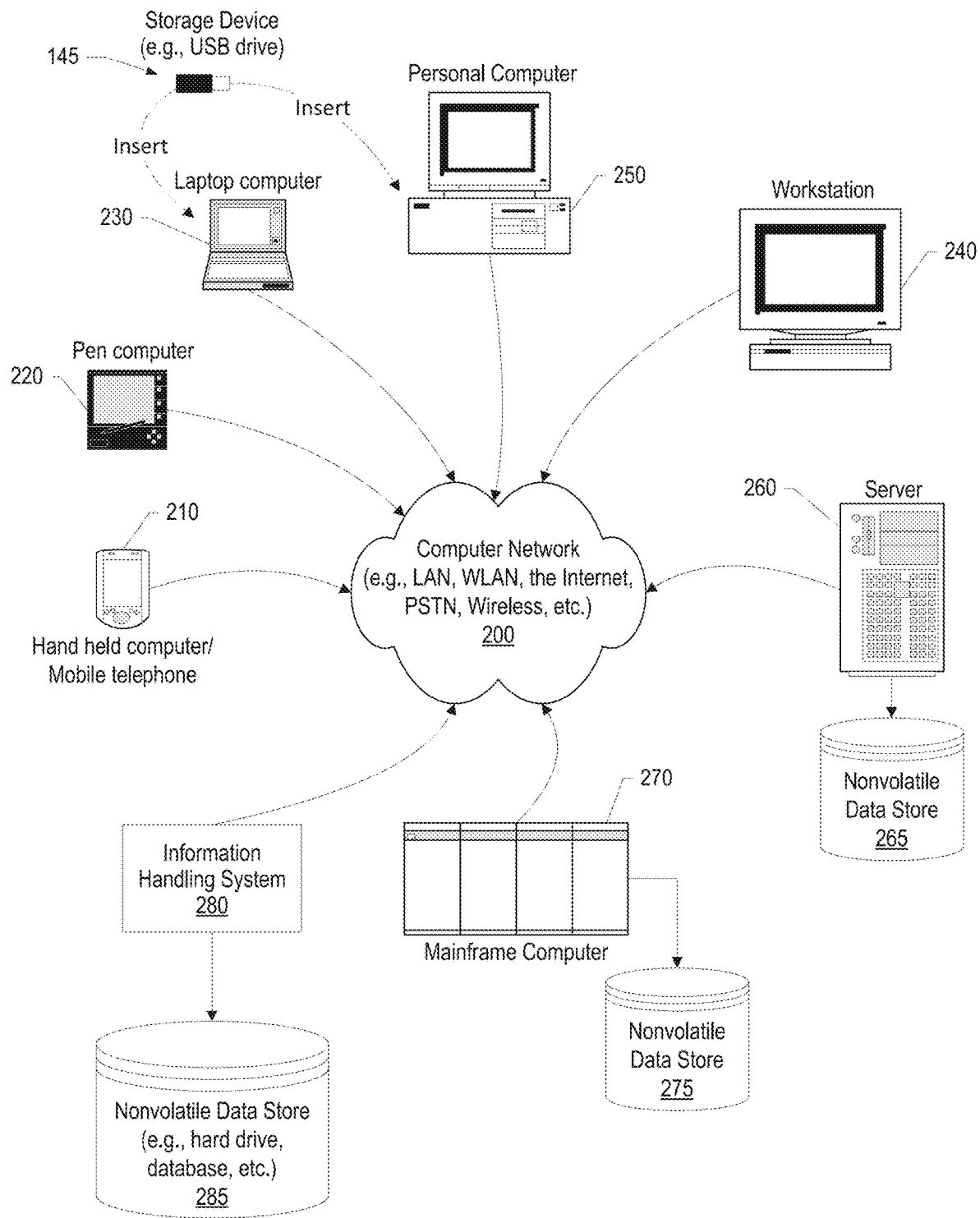
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3A:
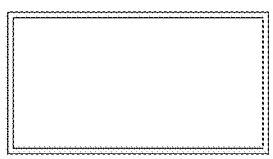
FIGS. 3A-3I provide various examples of intelligent arrays of lights being used to illuminate areas surrounding a display screen based on the environment.
Figure 3B:
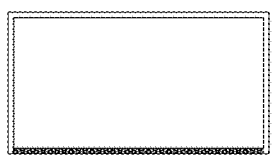
Figure 3C:
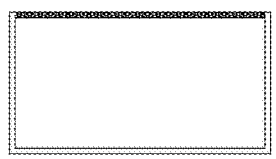
Figure 3D:
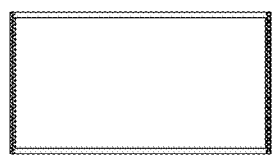
Figure 3E:
Figure 3F:
Figure 3G:
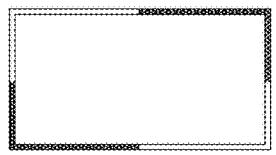
Figure 3H:
Figure 3I:
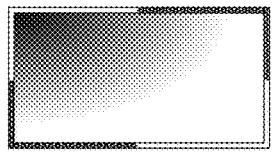

FIGS. 3A-3I provide various examples of intelligent arrays of lights being used to illuminate areas surrounding a display screen based on the environment. FIG. 3A is an example of lighting completely around the display. FIG. 3B is an example of lighting the top and sides around the display. FIG. 3C is an example of lighting the bottom and sides around the display. FIG. 3D is an example of lighting the top and bottom around the display. FIG. 3E is an example of lighting the left and right sides around the display. FIG. 3F is an example of lighting the top and right side around the display. FIG. 3G is an example of lighting the upper left and lower right corner areas around the display. FIG. 3H is an example of providing intermittent lighting areas around the display. FIG. 3I is an example of incorporating the light bars shown in FIGS. 3A-3H with an actual display.

Figure 4:
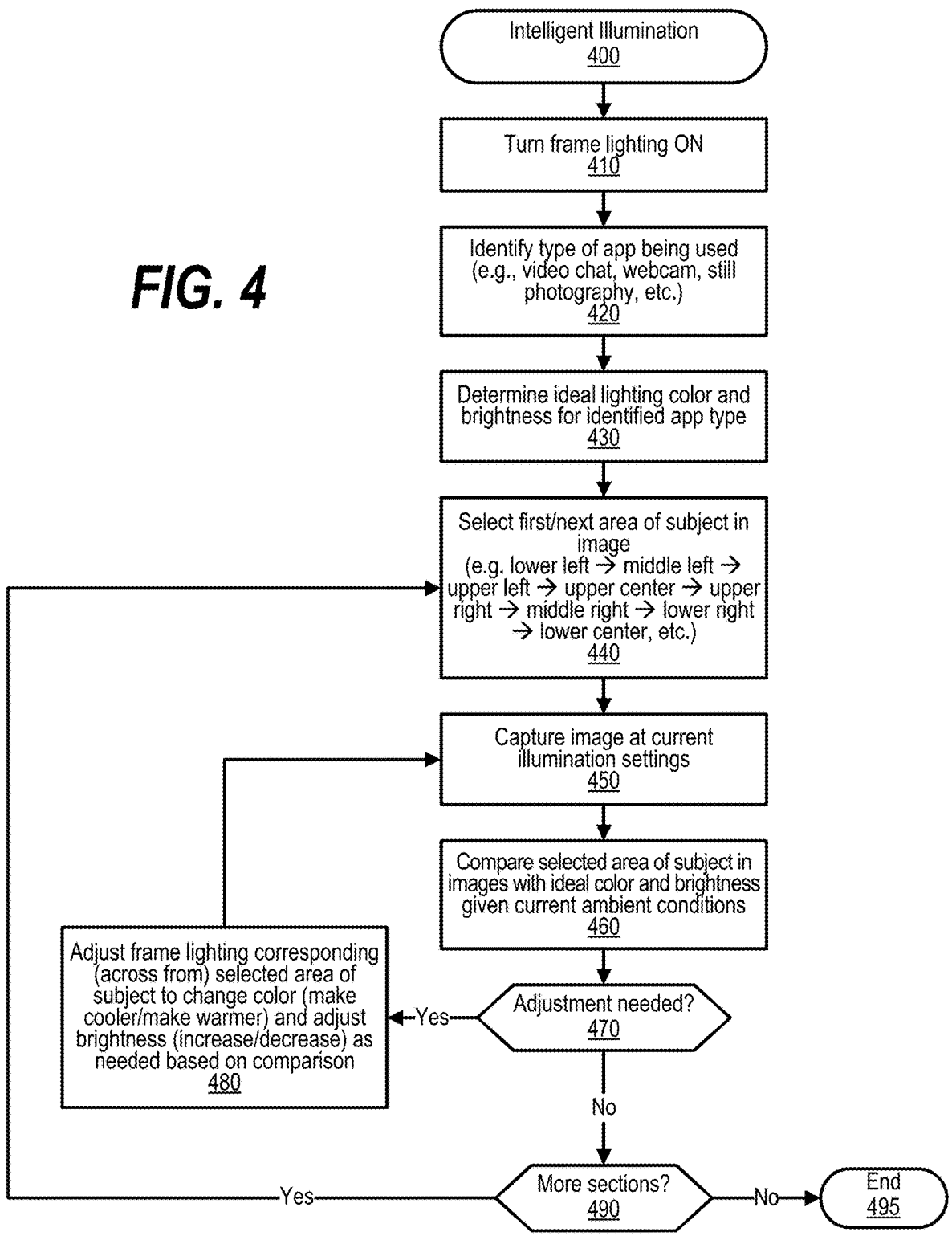
FIG. 4 is a flowchart showing steps taken by a process that provides intelligent illumination around a display screen.

FIG. 4 is a flowchart showing steps taken by a process that provides intelligent illumination around a display screen. FIG. 4 processing commences at 400 and shows the steps taken by a process that provides intelligent Illumination around a display screen, such as where a video capture operation is being performed that captures the image of a person sitting before the display screen. At step 410, the process turns the frame lighting ON. In an integrated environment where the frame lighting is integrated with the display screen (e.g., embedded LEDs surrounding the display screen, etc.), then power is provided to the array of LEDs. In an after market solution, such as a frame attached to the front of the display screen after the screen has been purchased, then communication to the intelligent array of LEDs is provided by a connection between the array of LEDs and the computer system, such as a USB cable from the array of LEDs that attaches to a USB port of the computer system by which the computer system can address the array of LEDs and turn individual LEDs on/off and control the attributes of the LEDs that are turned ON (e.g., color, brightness, etc.).

At step 420, the process identifies the type of video or image capturing application (app) that is currently being utilized by the user of the system, such as a video chat application, a webcam application, a still photography application, or the like. At step 430, the process determines an ideal lighting color (e.g., lighting "temperature" (cool white, warm white, other colors, etc.) and an ideal brightness for the identified type of application that is being used. The ideal color and brightness might be determined based on a user's previously inputted preference or based on an analysis of the type of application.

At step 440, the process selects the first area of the subject captured in an image that was captured by an digital camera that is directed a person or object positioned in front of the display screen. For example, areas could be the lower left of the image, the middle left of the image, the upper left of the image, the upper center of the image, the upper right of the image, the middle right of the image, the lower right of the image, and the lower center of the image. These areas can be further divided as needed.

At step 450, the process captures another digital image at the current illumination settings. At step 460, the process compares the selected area of the subject in the image with the ideal color and ideal brightness given the current ambient lighting conditions in the room or environment. The process determines as to whether an adjustment to the lighting conditions of the selected area are needed based on the comparison to the ideal conditions (decision 470).

If an adjustment is needed, then decision 470 branches to the 'yes' branch whereupon, at step 480, the process adjusts the frame lighting corresponding (across from) selected area of subject to change the color (e.g., make white color cooler, warmer, etc.) and adjust brightness to increase or decrease the brightness of the selected area as needed based on comparison to the ideal image color and ideal image brightness. Processing then loops back to step 440 to capture another image and compare the color/brightness of the selected area to the ideal color/brightness. This looping continues until no further adjustments are needed to the color/brightness of the selected area, at which point decision 470 branches to the 'no' branch ending the loop.

The process determines whether there are more sections to select and process to achieve the ideal color and brightness of these sections (decision 490). If there are more sections to process, then decision 490 branches to the 'yes' branch which loops back to step 440 to select and process the next section, or area. This looping continues until all of the sections (areas) of the image have been processed, at which point decision 490 branches to the 'no' branch exiting the loop. After all of the areas of the image have been adjusted to provide ideal color and brightness to each area, the digital camera is properly lighted for the application that is currently being used and FIG. 4 processing thereafter ends at 495.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system comprising a processor, a memory accessible by the processor, a digital camera accessible by the processor, a display screen accessible by the processor, and a plurality of sets of light emitting diodes (LEDs) surrounding the display screen, each of the sets having one or more LEDs, wherein the plurality of sets of LEDs is accessible by the processor, the method comprising:
   retrieving a set of one or more preferred image quality attributes;
   setting each of the plurality of sets of LEDs with one or more lighting attributes, wherein each set of LEDs emit light according to its corresponding lighting attribute;
   after the setting of each of the lighting attributes of each of the sets of LEDs, capturing, via the digital camera, one or more images of a subject illuminated by the plurality of LEDs;
   comparing one or more image qualities of the captured one or more images to the preferred image quality attributes; and
   adjusting at least one of the settings of at least one of the sets of LEDs based on the comparison, wherein at least a selected one of the lighting attributes of one of the sets of LEDs is different from the same selected lighting attribute of a different one of the sets of LEDs.

2. The method of claim 1 wherein at least one of the lighting attributes is selected from the group consisting of a lighting brightness and a lighting color.

3. The method of claim 1 further comprising:
   adjusting a lighting brightness of the selected set of LEDs.

4. The method of claim 1 further comprising:
   adjusting a lighting color of the selected set of LEDs.

5. The method of claim 4 wherein the lighting color is a color temperature ranging from a cool color to a warm color.

6. The method of claim 4 wherein the lighting color is a colored light.

7. An information handling system comprising:
   one or more processors;
   a memory coupled to at least one of the processors;
   a digital camera accessible by at least one of the processors;
   a display screen accessible by at least one of the processors;
   a plurality of sets of light emitting diodes (LEDs) surrounding the display screen, each of the sets having one or more LEDs, wherein the plurality of sets of LEDs is accessible by at least one of the processors;
   a set of computer program instructions stored in the memory and executed by at least one of the processors in order to perform actions comprising:
      retrieving a set of one or more preferred image quality attributes;
      setting each of the plurality of sets of LEDs with one or more lighting attributes, wherein each set of LEDs emit light according to its corresponding lighting attribute;

after the setting of each of the lighting attributes of each of the sets of LEDs, capturing, via the digital camera, one or more images of a subject illuminated by the plurality of LEDs;

comparing one or more image qualities of the captured one or more images to the preferred image quality attributes; and adjusting at least one of the settings of at least one of the sets of LEDs based on the comparison, wherein at least a selected one of the lighting attributes of one of the sets of LEDs is different from the same selected lighting attribute of a different one of the sets of LEDs.

8. The information handling system of claim 7 wherein at least one of the lighting attributes is selected from the group consisting of a lighting brightness and a lighting color.

9. The information handling system of claim 7 wherein the actions further comprise:

adjusting a lighting brightness of the selected set of LEDs.

10. The information handling system of claim 7 wherein the actions further comprise:

adjusting a lighting color of the selected set of LEDs.

11. The information handling system of claim 10 wherein the lighting color is a color temperature ranging from a cool color to a warm color.

12. The information handling system of claim 10 wherein the lighting color is a colored light.

13. A computer program product comprising:

a non-transitory computer readable storage medium, comprising computer program code that, when executed by an information handling system, executes actions comprising:

retrieving a set of one or more preferred image quality attributes;

setting each of a plurality of sets of LEDs with one or more lighting attributes, wherein each set of LEDs emit light according to its corresponding lighting attribute;

after the setting of each of the lighting attributes of each of the sets of LEDs, capturing, via a digital camera, one or more images of a subject illuminated by the plurality of LEDs;

comparing one or more image qualities of the captured one or more images to the preferred image quality attributes; and adjusting at least one of the settings of at least one of the sets of LEDs, based on the comparison, wherein at least a selected one of the lighting attributes of one of the sets of LEDs is different from the same selected lighting attribute of a different one of the sets of LEDs.

14. The computer program product of claim 13 wherein at least one of the lighting attributes is selected from the group consisting of a lighting brightness and a lighting color.

15. The computer program product of claim 13 wherein the actions further comprise:

adjusting a lighting brightness of the selected set of LEDs.

16. The computer program product of claim 13 wherein the actions further comprise:

adjusting a lighting color of the selected set of LEDs.

17. The computer program product of claim 16 wherein the lighting color is a color temperature ranging from a cool color to a warm color.

* * * * *